Nov. 5, 1946.   S. SHINOMIYA   2,410,753
DRILLING DEVICE
Filed June 26, 1941
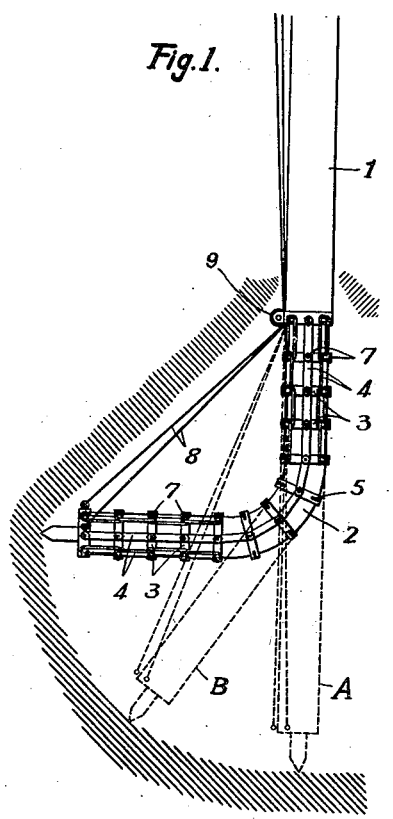
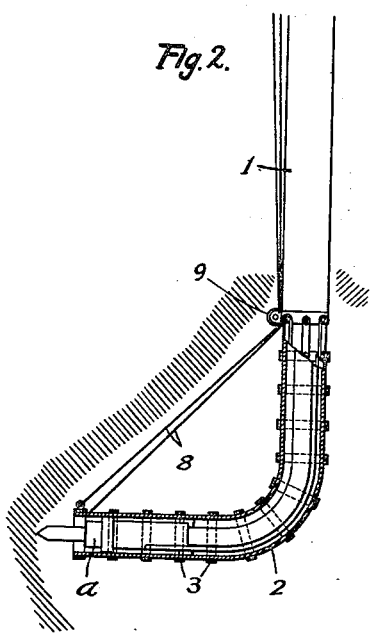
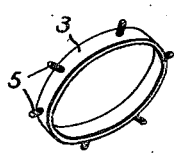
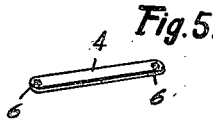
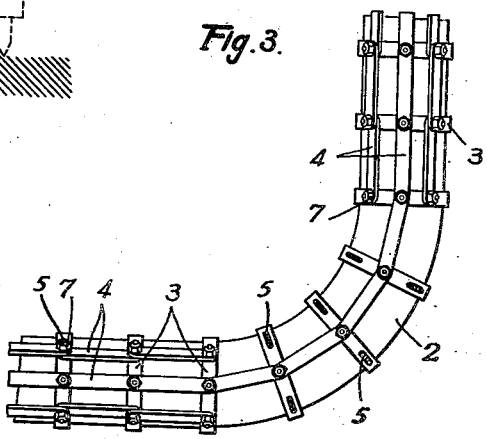
Inventor
S. Shinomiya
By E. F. Wendroth
Attorney Patented Nov. 5, 1946

2,410,753

UNITED STATES PATENT OFFICE 2,410,753

DRILLING DEVICE

Shigeru Shinomiya, Tokyo, Japan; vested in the Alien Property Custodian

Application June 26, 1941, Serial No. 399,917
In Japan June 29, 1940

1 Claim. (Cl. 255—19)

This invention relates to a drilling device comprising a drive pipe, a flexible pipe extending therefrom and having a plurality of rings mounted around same at intervals, a plurality of longitudinal connecting strips detachably mounted between each two adjacent rings connecting the latter, a cable which is attached to the free end of said flexible pipe and is adapted of being actuated from outside for bending said flexible pipe where a portion of said longitudinal connecting strips are removed, and a drilling mechanism provided at the free end of said flexible pipe.

The object of the invention is to provide a novel drilling device which is capable of being bent at predetermined point in predetermined direction in a deep oil-well by merely pulling a cable from outside the ground, so that it is possible to effect transverse drilling at a point in stratum of desired depth.

In the accompanying drawing in which one embodiment of the invention is shown by way of example:

Fig. 1 is a side elevation of the device according to this invention,

Fig. 2 is a similar view with a portion broken away,

Fig. 3 is an enlarged fragmental view,

Fig. 4 is a perspective view showing one of the rings used in this device, and

Fig. 5 is a perspective view showing one of the longitudinal connecting strips.

Referring to the drawing, 1 designates a vertical drive pipe having connected thereto a lower extension comprising a flexible pipe 2 which consists, for example, of a spirally wound steel strip. Around said flexible pipe 2, there are mounted at desired intervals a plurality of rings 3. Adjacent two rings 3 are connected by means of a plurality of longitudinal connecting strips 4. Each connecting strips 4 is provided at its ends with holes 6, and is mounted to the rings 3 by means of bolts 5 fixed to the rings 3 and nuts 7. A cable 8 is attached to the free end of the flexible pipe 2, and is extended to the outer end of the driving pipe 1 after being passed around a guide pulley 9. There is also provided a drilling means $a$ inserted in the free end of the flexible pipe 2, and a driving device (not shown) is enclosed within the pipe.

The operation of the device according to this invention is as follows:

At any position of the flexible pipe 2 where it is desired to be bent, the longitudinal strips 4 which lie along the inner and outer sides of the curvature to be formed are all removed, leaving other longitudinal strips 4 which lie in the opposite side faces as shown in Fig. 3. Then, the entire pipe is allowed to fall freely through a shaft as shown in dotted lines A. At the desired depth, the cable 8 is pulled from above the ground. Thus, the flexible pipe 2 is bent at the predetermined point in the predetermined direction, the remaining portions of the flexible pipe being held straight. The drilling operation is proceeded in any transverse direction by gradually varying the angle of bend by pulling the cable 8. By rotating the driving pipe, the drilling may be proceeded in different planes. Dotted lines B show an intermediate bent position of the flexible pipe.

According to this invention, at the desired portion of the flexible pipe to be bent, the longitudinal connecting strips 4 which prevent flexing of the pipe are all removed, leaving the other strips 4 which do not prevent such flexing. After inserting the entire device into the shaft, the flexible pipe 2 can be bent at predetermined point in predetermined direction by pulling the cable 8 from outside the ground, and the remaining portion of the flexible pipe is held straight, so that it is possible to effect transverse drilling at any desired deep stratum.

What I claim is:

In a drilling device, the combination of a flexible pipe; a plurality of collars mounted on said pipe in relatively spaced relation longitudinally of the pipe, and provided peripherally with radially extending pins; rigid links mounted on said pins to connect said collars, the collars on two non-adjacent portions of said pipe being connected by a plurality of links, two of which links are on diametrically opposite sides of said pipe, the remaining links being disposed at points on the circumference of said pipe intermediate said two links, the disposition of said links being such as to render inflexible the said two portions of the pipe, and the collars on the portion of the pipe intermediate said two non-adjacent portions being connected by only pairs of links on diametrically opposite sides of the pipe respectively thereby rendering flexible said intermediate portion of the pipe; means for bending said intermediate portion; and a drilling element mounted at the free end of said pipe.

SHIGERU SHINOMIYA.